UNITED STATES PATENT OFFICE.

ROBERT MANDELBAUM, OF ASPERG, GERMANY.

PROCESS FOR THE SUPPRESSION OF DUST DURING THE WORKING UP OF PANAMA BARK.

1,128,472. Specification of Letters Patent. Patented Feb. 16, 1915.

No Drawing. Application filed August 19, 1913. Serial No. 785,515.

*To all whom it may concern:*

Be it known that I, Dr. Ing. ROBERT MANDELBAUM, residing at Asperg, in the Kingdom of Wurttemberg, Empire of Germany, have invented certain new and useful Improvements in Processes for the Suppression of Dust During the Working Up of Panama Bark, of which the following is a specification.

In technical establishments of the most varied kind, as well as in public life generally the formation of dust is always felt as a most irksome evil. Suggestions have been advanced and experiments made in every possible direction, aiming at the elimination of dust, but all the measures for keeping dust down, so far as they have been made known, represented merely periodical attempts without lasting effect, immaterial, whether it was by mechanical action or by damping materials, to which disinfecting substances might be added, if need be, with due observance of hygienic principles.

During the preparation of Panama bark the great development of dust is most sensibly felt, owing to its poisonous hemolytical nature and irritating effects on the human organism, especially on the mucous membranes in the nose, eyes and throat, with cough to begin with. The devices against all this, resorted to up to the present, such as respirators, etc., are insufficient, because they are unable permanently to attach to the bark those infinitesimal particles, inherent to Panama bark, from which they detach themselves during the process of preparation. Owing to this fact the use of Panama bark for domestic purposes is a comparatively small one, in spite of the other well-known excellent properties of this drug, since the consumers have up to this present time not been protected sufficiently against its noxious secondary effects. The present invention accomplishes the permanent attachment of these infinitesimal particles,—sometimes equal to 10% of the weight of the bark—or in other words, the loading of them to such a degree as to deprive them thoroughly of their capacity to turn into dust, with the result that even during the working up of the bark no dust is formed. This is attained in the following way: Let the bark for instance be treated with a solution of hygroscopic bodies, such as chlorid of calcium ($CaCl_2$) or of zinc ($ZnCl_2$) or mixtures of such bodies, when the hygroscopic properties of these bodies will effect a permanent attachment of all the powdery particles to the bark; moreover may the Panama bark be impregnated with a concentrated solution of borax, which possesses the capacity of covering the bark after evaporation completely with a layer impenetrable to dust; finally the Panama bark may be damped with a solution of such bodies as will stick, in the full sense of the word, the loosely attached particles permanently to the bark, such bodies being for instance all solutions of glue, dextrin, sugar, etc., to which may with advantage be added the hygroscopic bodies aforementioned, the purpose being the prevention of mold on the Panama bark through their antibacterian action. This latter effect may, however, be attained also by the addition of salicylic acid or other similar substances. The operation with hygroscopic bodies may also be carried out by mixing the powdered Panama bark with the dry bodies when the intended effect will be arrived at either by the influence of the damp air or by the addition of water. The Panama bark treated in this way has completely lost those irritating properties which induce coughing. The said proceeding in addition allows of a more economical utilization of the Panama bark, because the dust, which formerly resulted from the operation, had a considerably lower market value than the cut Panama bark, in consequence of its irksome effects.

What I claim and desire to secure by Letters Patent is:

1. The herein described process for preventing the formation of dust like particles during the preparation of Panama bark which consists in impregnating the bark with a substance which will permanently attach to the bark the dust like particles ordinarily formed during the mechanical preparation of the bark.

2. The herein described process for preventing the formation of dust like particles during the preparation of Panama bark which consists in impregnating the bark with a substance having hygroscopic properties.

3. The herein described process for preventing the formation of dust like particles during the preparation of Panama bark which consists in impregnating the bark with a solution of a hygroscopic substance and an adhesive substance.

In testimony whereof I affix my signature in presence of two witnesses.

DR. ING. ROBERT MANDELBAUM.

Witneses:
JEAN GULDEN,
RUDOLF WALTERS.

Copies of this patent may be obtained for five cents each, by addressing the "Commissioner of Patents, Washington, D. C."